United States Patent
Efstathopoulos

(10) Patent No.: US 9,606,817 B1
(45) Date of Patent: Mar. 28, 2017

(54) SYSTEMS AND METHODS FOR VIRTUALIZING INTERNET OF THINGS (IOT) DEVICES

(71) Applicant: Symantec Corporation, Mountain View, CA (US)

(72) Inventor: Petros Efstathopoulos, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/748,039

(22) Filed: Jun. 23, 2015

(51) Int. Cl.
G06F 9/455 (2006.01)
G06F 9/50 (2006.01)
G06F 9/44 (2006.01)

(52) U.S. Cl.
CPC ............ *G06F 9/455* (2013.01); *G06F 9/4443* (2013.01); *G06F 9/45533* (2013.01); *G06F 9/5016* (2013.01); *G06F 9/5027* (2013.01)

(58) Field of Classification Search
USPC .............................................. 718/1, 100–108
IPC ........................................... G06F 9/445,9/4443
See application file for complete search history.

(56) References Cited

U.S. PATENT DOCUMENTS

| | | | | |
|---|---|---|---|---|
| 6,125,382 A * | 9/2000 | Brobst | ..................... | G06F 9/465 718/102 |
| 6,678,715 B1 * | 1/2004 | Ando | ..................... | G06F 9/4862 709/201 |
| 6,738,971 B2 * | 5/2004 | Chandrasekaran | ..... | G06F 9/466 718/100 |
| 8,060,876 B2 * | 11/2011 | Smith | ..................... | G06F 21/53 718/1 |
| 8,234,650 B1 * | 7/2012 | Eppstein | ............... | G06F 9/5072 709/220 |
| 8,448,171 B2 * | 5/2013 | Donnellan | .......... | H04L 61/2007 718/1 |
| 8,533,699 B2 * | 9/2013 | Moir | ....................... | G06F 9/467 717/151 |
| 8,612,172 B2 * | 12/2013 | Wirola | ..................... | G01O 5/06 702/144 |
| 8,640,127 B2 * | 1/2014 | Gracin | ................ | H04L 12/6418 709/227 |

(Continued)

OTHER PUBLICATIONS

Alves et al, "Towards a Pluralist Internet Using a Virtual Machine Server for Network Customization", ACM, pp. 9-16, 2012.*

(Continued)

*Primary Examiner* — Anil Khatri
(74) *Attorney, Agent, or Firm* — Womble Carlyle Sandridge & Rice LLP

(57) ABSTRACT

A virtual element includes a communication component that controls, from a remote location, communication with an Internet of Things (IoT) device of a plurality of IoT devices. The virtual element also includes a capabilities augmenting component that facilitates access to resources that augment the capabilities of the IoT device of the plurality of IoT devices. The tasks of the IoT device are allocable to one or more different devices and are performed by the one or more different devices. An interface accessing component facilitates access to information that is directed to the IoT device from an interface that is common to the plurality of IoT devices, and facilitates access to information that is provided from the IoT device.

18 Claims, 3 Drawing Sheets

(56) References Cited

U.S. PATENT DOCUMENTS

| | | | | |
|---|---|---|---|---|
| 8,850,428 B2* | 9/2014 | Dotan | ...................... | G06F 21/53 |
| | | | | 711/114 |
| 8,959,511 B2* | 2/2015 | Sinha | .................. | G06F 9/45558 |
| | | | | 718/1 |
| 8,966,377 B2* | 2/2015 | Tarkoma | ............... | G06F 9/4445 |
| | | | | 707/790 |
| 9,009,437 B1* | 4/2015 | Bjornsson | ............. | G06F 3/0665 |
| | | | | 370/389 |
| 9,215,551 B2* | 12/2015 | Yang | ..................... | H04W 4/005 |
| 2008/0183800 A1 | 7/2008 | Herzog et al. | | |

OTHER PUBLICATIONS

Kim et al, "Virtual Federated Network Operations on Future Internet", ACM, pp. 1-3, 2011.*
Chari et al, "Building Efficient and Highly Run-Time Adaptable Virtual Machines", ACM, pp. 60-71, 2016.*
Lange et al, "Transparent Network Services via a Virtual Traffic Layer for Virtual Machines", ACM, pp. 23-32, 2007.*
Rizzo et al, "Speeding Up Packet I/O in Virtual Machines", IEEE, pp. 47-58, 2013.*
Li et al, A High-efficient Inter-Domain Data Transferring System for Virtual Machines, ACM, pp. 385-390, 2009.*

* cited by examiner

SYSTEMS AND METHODS FOR VIRTUALIZING INTERNET OF THINGS (IOT) DEVICES

BACKGROUND

The Internet of Things (IoT) is the network of physical objects or "things" embedded with electronics, software, sensors and connectivity to enable it to achieve greater value and service by the exchange of data with the manufacturer, operator and/or other connected devices. Each "thing" is uniquely identifiable through its embedded computing system and has the capacity to interoperate within the existing Internet infrastructure.

Enterprise IoT platforms that include a wide variety of devices, device capabilities, communication idiosyncrasies and other disparities can present device management complications (they can present a disparate profile of capabilities, protocols, communications, APIs etc.). Moreover, limitations of the capabilities possessed by individual IoT devices limit application development for them.

Mobile virtualization is hardware virtualization on a mobile phone or other connected wireless device. Virtualization enables multiple operating systems or virtual machines to run simultaneously on a mobile phone or other connected wireless device. A hypervisor creates secure separation between the underlying hardware and the software that runs on top of it. Virtualization technology has been conventionally used in conjunction with data servers and personal computers.

Some mobile virtualization approaches include cloud-hosted platforms that aim to simulate large numbers of mobile end-points. However, applications for the mobile end-points whose execution include tasks that are resource intensive can't be used where the resource capability of the mobile device end-points is limited or otherwise insufficient to execute the applications. Accordingly, a significant shortcoming of conventional virtualization approaches is the inherent limitations on the types of applications that can be developed using those approaches.

SUMMARY

Some conventional approaches to virtualization discourage application development for mobile devices because of the resource limitations that the devices possess. Systems for virtualizing IoT devices are disclosed that address the aforementioned shortcomings of conventional virtualization approaches. However, the claimed embodiments are not limited to implementations that address any or all of the aforementioned shortcomings. As a part of the aforementioned systems, system components are disclosed that include a communication component that controls, from a remote location, communication with an IoT device of a plurality of IoT devices. Also, disclosed is a capabilities augmenting component that facilitates access to resources that augment the capabilities of the IoT device of the plurality of IoT devices. Tasks of the IoT device are allocable to one or more other devices and are performed by the one or more other devices on behalf of the IoT device. An end user interface accessing component is disclosed that accesses information that is directed to the IoT device from an end user interface that is common to the plurality of IoT devices, and provides access to information that is provided from the IoT device the end user interface. Exemplary embodiments encourage the development of applications for IoT devices in IoT networks by accommodating the execution of such for IoT devices whose native resources may be insufficient to do so.

BRIEF DESCRIPTION OF THE DRAWINGS

The described embodiments and the advantages thereof may best be understood by reference to the following description taken in conjunction with the accompanying drawings in which.

It should be noted that like reference numbers refer to like elements in the figures.

DETAILED DESCRIPTION

Figure 1A:
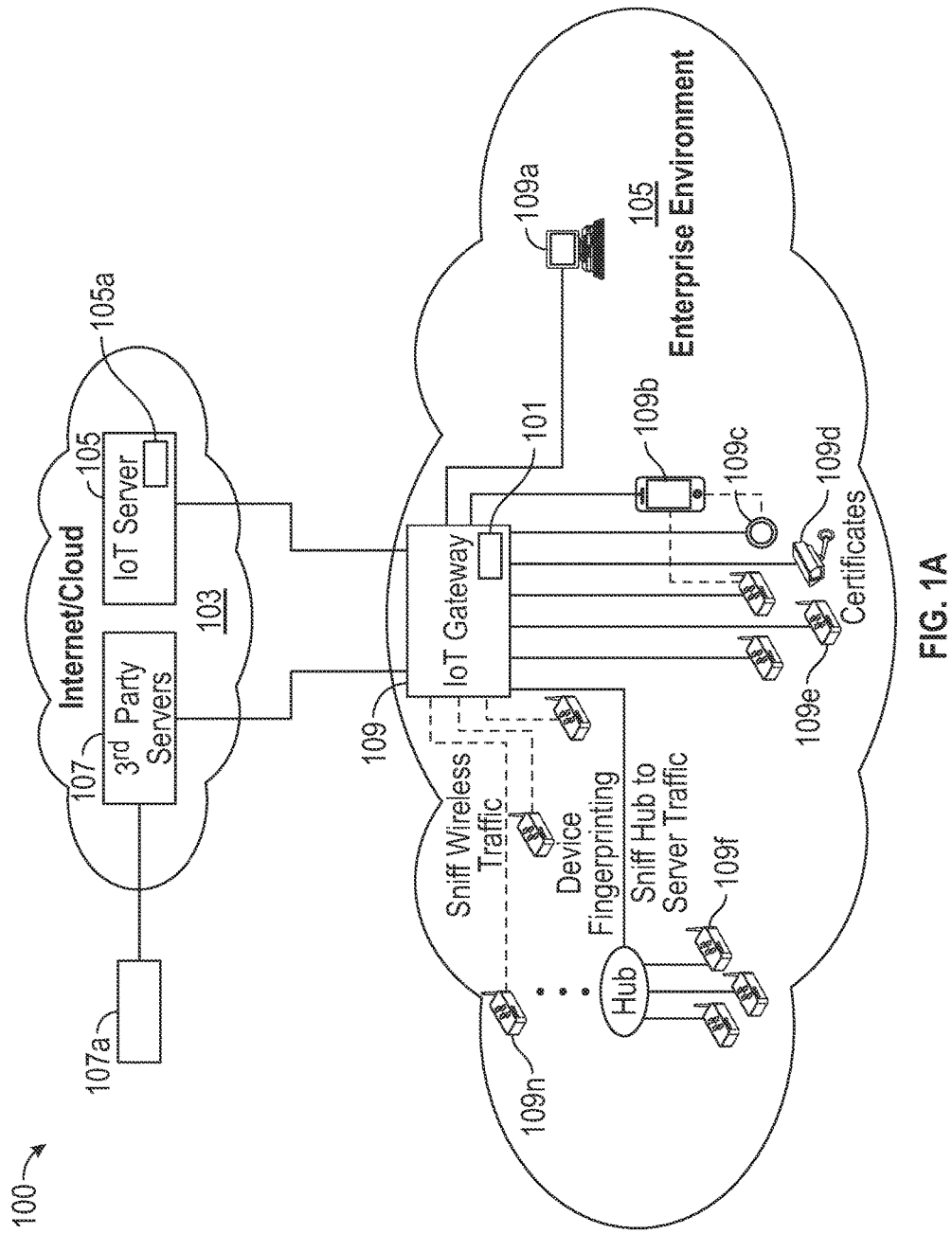
FIG. 1A shows a typical operating environment of a system for virtualizing IoT devices according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result.

The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "controlling" or "facilitating" or "accessing" or "presenting" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

FIG. 1A shows a typical operating environment of a system 101 for virtualizing IoT devices. System 101 provides a unified and standardized communication interface between management logic and IoT devices and allocates resource intensive tasks to devices that act on behalf of the IoT devices. Exemplary embodiments facilitate the development of applications for IoT devices in IoT networks by accommodating the development of applications, for the IoT devices, whose execution would present challenges to their native resource capability. FIG. 1A shows enterprise environment 105 that includes system 101, IoT gateway 109 and IoT devices 109a-n. In addition, FIG. 1A shows cloud entities that include IoT server 105, management logic 105a, third party servers 107 and end users 107a.

IoT devices 109a-n are connected or coupled to an IoT network and are configured to receive and transmit information via the IoT network. IoT devices 109a-n can encompass various types of devices and can include but are not limited to handheld devices, computers, sensors, cameras, hubs etc. (see FIG. 1A). In particular, IoT devices 109a-n can include any device capable of transmitting and/or receiving data via IoT network. In one embodiment, IoT devices can present a wide variety of capabilities, communication idiosyncrasies and/or other disparities that are intermediated by system 101 (see discussion below) for presentation to management logic 105a and/or end users 107a. Accordingly, although IoT devices 109a-n may use different native communication protocols, IoT devices 109a-n, by means of system 101, are enabled to generate communications that are seen by management logic 105a and/or end users 107a as using the same communication protocol.

IoT gateway 109 is a computer system that operates as an interface between IoT devices 109a-e and IoT server 105 and/or third party servers 107. In one embodiment, IoT gateway 109 can be a computer system with a significant amount of processing and memory resources. In one embodiment, as described herein, these resources can be allocated to resource intensive tasks that have been off loaded from IoT devices 109a-e. In addition, IoT gateway 109 can provide a platform from which system 101 operates. In other embodiments, system 101 can operate on other device platforms.

IoT server 105 responds to requests (such as requests from IoT devices 109a-n) from across the IoT network, to provide, or help to provide, a network or data service. In one embodiment, these operations can be performed by management logic 105a that is resident on IoT server 105. In one embodiment, as discussed above, IoT server 105 receives communications from IoT devices 109a-n that have been standardized. In addition, IoT server 105 is presented with a view of the capability of IoT devices 109a-n that is based on capability that is at least in part augmented by resources of IoT gateway 109 and/or other devices and/or computer systems that are a part of the IoT network. In one embodiment, IoT server 105 can access a unified user interface (the unified user interface is discussed in detail below) for IoT devices 109a-n.

Third party server 107 is a computer system and non IoT device that is equipped and authorized to access IoT devices via IoT gateway 109. In one embodiment, third party server 105 receives communications from IoT devices 109a-n that have been standardized. In addition, third party server 107, similar to IoT management logic 105a, is presented with a view of the capability of IoT devices 109a-n that is based on capability that is at least in part augmented by resources of IoT gateway 109 and/or other devices and/or computer systems that are a part of the IoT network. In one embodiment, third party server 107 can access a unified user interface (unified user interface is discussed in detail below) for IoT devices 109a-n.

Referring again to FIG. 1A, system 101 for virtualizing IoT devices provides a uniform and standardized interface between management logic and IoT devices. For example, in one embodiment, system 101 presents a uniform and standardized communication and capability interface to management logic for IoT devices that are connected to its associated IoT network. In one embodiment, system 101 does this by mediating and controlling communications between IoT devices 109a-n and management logic 105a. In addition, system 101 presents management logic 105a with a view of the capability of individual IoT devices that is based on capability that is at least in part augmented through the operation of system 101. As regards user interfaces, in one embodiment, system 101 can include a unified user interface engine (described below with reference to FIG. 2) that provides a unified user interface to the outside world. More specifically, the user interface that is presented to the outside world can be the same for each of the IoT devices 109a-n.

In one embodiment, system 101 can include a plurality of virtual elements that correspond to each of the IoT devices 109a-n connected to the IoT network and that provide the above discussed functionality. It should be appreciated that component parts of the virtual elements are described in detail below. In one embodiment, system 101 can be included as a part of an existing software application or logic that is associated with IoT gateway 109 (e.g., a proxy server access facilitating application and/or circuit).

In one embodiment, each of the above discussed virtual elements of system 101 constitute a "shadow proxy" (e.g., a thin virtual machine) that is provided for each IoT device 109a-n. In another embodiment, the "shadow proxy" can be an actual computer (e.g., a more capable device than the IoT device such as a personal computer, Raspberry Pi™, etc.). In some embodiments, each virtual element is constructed or configured to achieve the following: (1) the exposure of a unified set of capabilities and interfaces to the "outside world" (e.g., higher levels of management logic, end-users, etc.), (2) the management of I/O and communications to and from IoT devices 109*a-n* (direct interaction with the actual IoT device may not be allowed—except some privileged management operations), (3) an abstracting away of actual communication with IoT devices 109*a-n* by providing back-end drivers for each class of IoT device, and (4) the off-loading of computation and other resource-intensive operations on behalf of the device. IoT gateway 109 (management server/gateway) can support hundreds or even thousands or more of such lightweight IoT "shadow proxy" instances. Establishing this type of proxying for devices is advantageous, in terms of both IoT management and system programmability. In exemplary embodiments, virtualization principles are applied to conceal the device characteristics of IoT devices for purposes of improved enterprise IoT management.

Figure 1B:
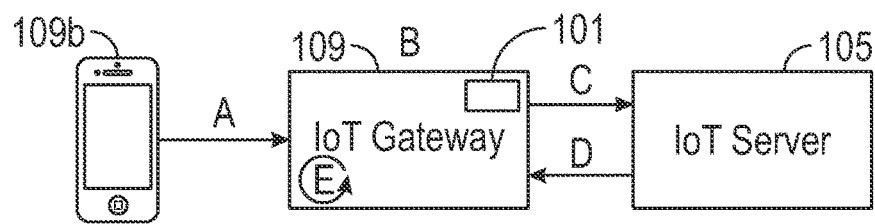
FIG. 1B illustrates operations of the system for virtualizing IoT devices and other components of a typical operating environment according to one embodiment.

FIG. 1B illustrates the operation of system 101 for virtualizing IoT devices and other components of its typical operating environment according to one embodiment. These operations, which relate to the virtualizing of IoT devices, are only exemplary and not meant to be limiting. It should be appreciated that other operations not illustrated in FIG. 1B can be performed in accordance with one embodiment. Referring to FIG. 1B, at A, an IoT device 109*b* sends a communication to IoT server 105 that is accessed by IoT gateway 109. In one embodiment, IoT device 109*b* can use a native protocol for the communication that is different from the native protocols of one or more of the other IoT devices 109*a* and 109*c-n*.

At B, gateway server 109 receives the communication sent by IoT device 109*b*. In one embodiment, as described herein in detail, gateway server 109 can provide the platform on which system 101 operates (e.g., system 101 can execute on gateway server 109). In other embodiments, system 101 can execute on other device platforms.

At C, system 101 facilitates the forwarding of the communication according to a predetermined standard protocol to IoT server 105. In one embodiment, the predetermined standard protocol is the same one that gateway server 109 uses to forward communications from other IoT devices to IoT server 105. At D, IoT server 105 replies to the communication. For example, where there has been a request for data, the data is provided for IoT device 109*b* to gateway server 109.

At E, where processing the data involves resource intensive tasks, one or more tasks are assigned to resources of gateway server 109 or other devices. In one embodiment, gateway server 109 can perform a portion or all of the tasks on behalf of IoT device 109*b*. Similarly, other designated devices can perform a portion or all of the tasks on behalf of IoT device 109*b*. For example, with respect to a camera or other image capture device, the data generated by an IoT device can be processed by gateway server 109 or other computing device to allow for enhanced functionality that would not be able to be achieved by the limited processing or computing capability of the IoT device. More specifically, the image data can be processed for facial recognition or other image processing functionality in some embodiments. It should be appreciated that this is just one example and numerous other examples may be integrated with the embodiments to provide enhanced functionality for the data captured through any of the IoT devices by taking advantage of the processing power of gateway server 109 or other computing device communicating with the gateway server.

Figure 2:
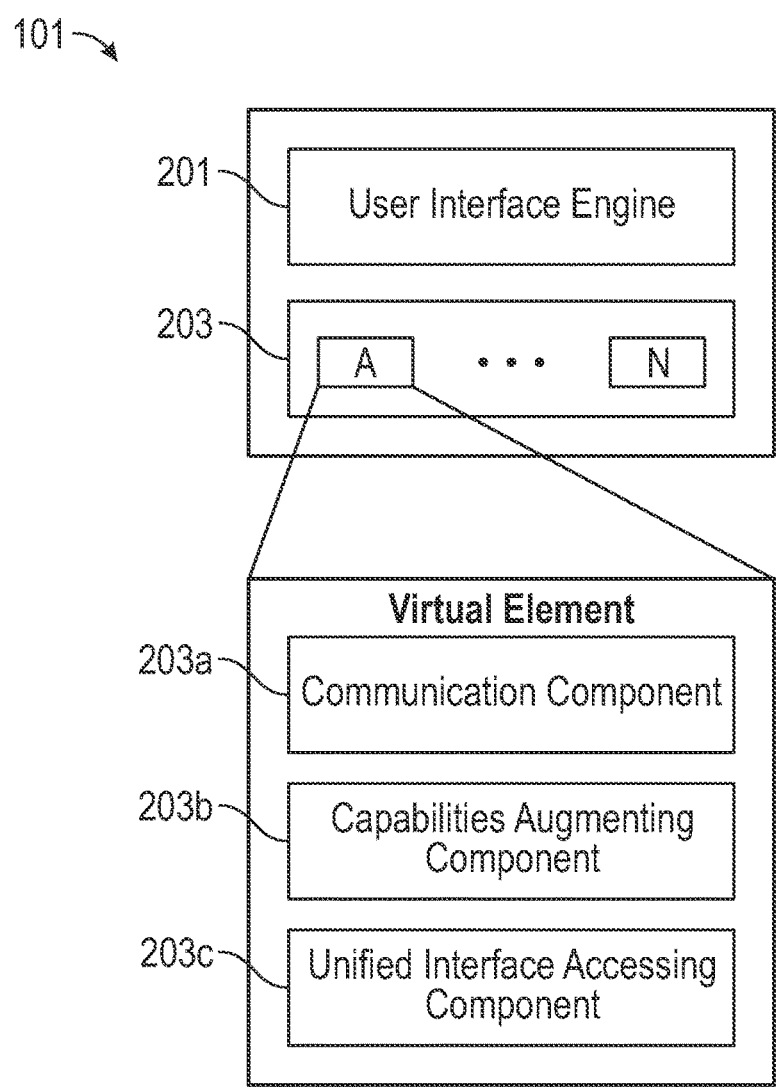
FIG. 2 shows exemplary components of system for virtualizing IoT devices according to one embodiment.

FIG. 2 shows exemplary components of system 101 for virtualizing IoT devices according to one embodiment. The components shown in FIG. 2 implement an algorithm for virtualizing IoT devices. In one embodiment, components of system 101 include unified user interface engine 201 and plurality of virtual elements 203 (A-N). User interface engine 201 provides a unified user interface to the outside world. Virtual elements 203 include at least a virtual element for each IoT device in the IoT network. In the FIG. 2 embodiment, components of virtual elements 203 (each of virtual elements A-N) include a communication component 203*a*, a capabilities augmenting component 203*b* and a unified user interface accessing component 203*b*.

Referring to FIG. 2, communication component 203*a* controls communication with an IoT device (e.g., 109*b* of FIG. 1A) of a plurality of IoT devices (e.g., 109*a-n* of FIG. 1A). In one embodiment, communication component 203*a* can include back end drivers that provide an interface to programs to access functions of the IoT device. The drivers can allow a program access to an IoT device without the program having to know details of the IoT device (e.g., device type). Additionally, communication component 203*a* can include protocol conversion components that convert the protocol of an IoT device to a standard protocol that is used for all of the IoT devices of the IoT network. In other embodiments, the standard protocol may not be used for all of the IoT devices.

Capabilities augmenting component 203*b* facilitates access to resources that augment the capabilities of the IoT device of the plurality of IoT devices. In one embodiment, capabilities augmenting component 203*b* can allocate resource intensive tasks performed as a part of the operation of one IoT device to other devices and/or systems (e.g., IoT gateway 109 in FIG. 1A) that perform the task on behalf of the IoT device. Capabilities augmenting component 203*b* allocates resource intensive tasks to other devices where available resources of the other devices and/or systems make them more capable of performing the resource intensive tasks. In one embodiment, resources can include but are not limited to processor bandwidth and available memory of a proxy device that is a candidate to perform a task. Unified interface accessing component 203*c* accesses information that is directed to the IoT device from user interface engine 201, and provides access to information that is provided from the IoT device to user interface engine 201.

The embodiments provide a virtual element includes a communication component that controls, from a remote location, communication with an IoT device of a plurality of IoT devices. It also includes a capabilities augmenting component that facilitates access to resources that augment the capabilities of the IoT device of the plurality of IoT devices. The tasks of the IoT device are allocable to one or more different devices and are performed by the one or more different devices on behalf of the first IoT device. An interface accessing component facilitates access to information that is directed to the IoT device from an interface that is common to the plurality of IoT devices, and facilitates access to information that is provided from the IoT device to the interface that is common to the plurality of devices.

It should be appreciated that the aforementioned components of system 101 can be implemented in hardware or software or in a combination of both. In one embodiment, components and operations of system 101 can be encompassed by components and operations of one or more computer programs (e.g., a proxy server access facilitating application and/or circuit). In another embodiment, components and operations of system 101 can be separate from the aforementioned one or more computer programs but can operate cooperatively with components and operations thereof.

Figure 3:
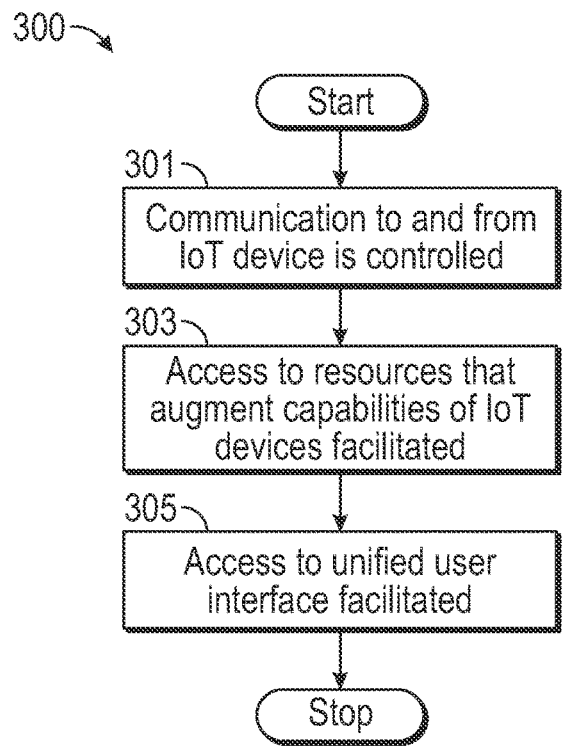
FIG. 3 shows exemplary components of system for virtualizing IoT devices according to one embodiment.

FIG. 3 shows a flowchart 300 of the steps performed in a method for virtualizing an IoT device according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 3, at 301, from a location remote to an IoT device of a plurality of IoT devices, communication to and from the IoT device of the plurality of IoT devices is controlled. In one embodiment, as described herein control of communication to and from an IoT device can include protocol conversion operations wherein the protocol of an IoT device is converted to a standard protocol that is used for each of the IoT devices of the IoT network. Moreover, in one embodiment, controlling communication can include the use of back end drivers that control access to functions of the IoT devices.

At 303, access to resources that augment the capabilities of the IoT device of the plurality of IoT devices is facilitated wherein resource intensive tasks of the IoT device can be allocated to one or more different devices for performance by the one or more different devices on behalf of the IoT device. In one embodiment, the resources can include but are not limited to processor bandwidth and available memory of a proxy device candidate to perform a task.

At 305, access to information that is directed to the IoT device from a unified user interface that is common to the plurality of IoT devices is facilitated for forwarding to the IoT device, and access to information that is provided from the IoT device for presenting via the unified user interface is facilitated. In one embodiment, the unified user interface is a user interface that is presented to entities that are located outside of or external to the IoT enterprise environment.

Figure 4:
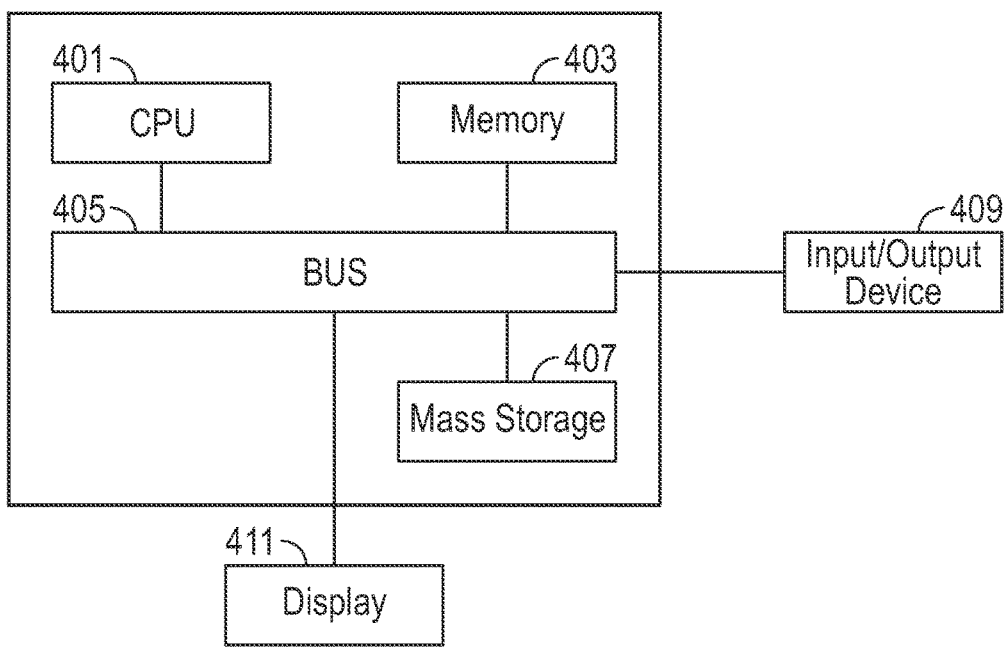
FIG. 4 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 4 is an illustration showing an exemplary computing device which may implement the embodiments described herein. The computing device of FIG. 4 may be used to perform embodiments of the functionality for detection of network intrusion in accordance with some embodiments. The computing device includes a central processing unit (CPU) 401, which is coupled through a bus 405 to a memory 403, and mass storage device 407. Mass storage device 407 represents a persistent data storage device such as a floppy disc drive or a fixed disc drive, which may be local or remote in some embodiments. The mass storage device 407 could implement a backup storage, in some embodiments. Memory 403 may include read only memory, random access memory, etc. Applications resident on the computing device may be stored on or accessed via a computer readable medium such as memory 403 or mass storage device 407 in some embodiments. Applications may also be in the form of modulated electronic signals modulated accessed via a network modem or other network interface of the computing device. It should be appreciated that CPU 401 may be embodied in a general-purpose processor, a special purpose processor, or a specially programmed logic device in some embodiments.

Display 411 is in communication with CPU 401, memory 403, and mass storage device 407, through bus 405. Display 411 is configured to display any visualization tools or reports associated with the system described herein. Input/output device 409 is coupled to bus 405 in order to communicate information in command selections to CPU 401. It should be appreciated that data to and from external devices may be communicated through the input/output device 409. CPU 401 can be defined to execute the functionality described herein to enable the functionality described with reference to FIGS. 1-3. The code embodying this functionality may be stored within memory 403 or mass storage device 407 for execution by a processor such as CPU 401 in some embodiments. The operating system on the computing device may be MS DOS, MS-WINDOWS, OS/2™, UNIX, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A virtual element, wherein the virtual element is implemented using physical computing components in a processor-based virtual computing environment, the virtual element comprising:
    a communication component that generates at least one control signal to controls, from a remote location, communication with an Internet of Things (IoT) device of a plurality of IoT devices, wherein each of the plurality of IoT devices includes an associated communication protocol and the communication component translates each respective communication protocol of a receiving IoT device and a transmitting IoT device to generate the at least one control signal based upon each respective communication protocol,
    wherein the communication component transfers information to the receiving IoT device based upon the associated communication protocol;
    a capabilities augmenting component coupled to receive the at least one control signal to facilitate access to resources of a computing device that augment the capabilities of the IoT device of the plurality of IoT devices,
    wherein tasks of the IoT device are allocable to one or more different computing devices and performed by the one or more different computing devices on behalf of the IoT device; and
    an interface component coupled to the communication component to access the information that is directed to the IoT device from an interface that is common to the plurality of IoT devices, and to provide access to information that is provided from the IoT device that is presented on the interface;

wherein the communication component, the capabilities augmenting component and the interface component comprise components of a virtual machine.

2. The virtual element of claim 1 wherein the communication component comprises IoT device drivers and transmitting and receiving components.

3. The virtual element of claim 1 wherein the communication component provides outputs that use a communication protocol that is uniform across the plurality of IoT devices.

4. The virtual element of claim 1 wherein the capabilities augmenting component facilitates access to resources that comprise computational and memory resources.

5. The virtual element of claim 1 wherein the interface is a user interface.

6. The virtual element of claim 1 wherein the resources that augment the capabilities of the IoT device are located on one or more devices which are located remotely to the IoT device.

7. A system for virtualizing IoT devices, the system comprising;
   a computing device having a common user interface; and
   a plurality of virtual elements that correspond to individual IoT devices, each of the virtual machines comprising:
   a communication component that generates at least one control signal to controls communication with an IoT device of a plurality of IoT devices, wherein each of the plurality of IoT devices includes an associated communication protocol and the communication component translates each respective communication protocol of a receiving IoT device and a transmitting IoT device to generate the at least one control signal based upon each respective communication protocol
   wherein the communication component transfers information to the receiving IoT device based upon the associated communication protocol;
   a capabilities augmentation component coupled to receive the at least one control signal to facilitate access to resources of a computing device that augment the capabilities of the IoT device of the plurality of IoT devices; and
   an interface component coupled to the communication component to access the information that is directed to the IoT device from an interface that is common to the plurality of IoT devices, and to provide provides access to information that is provided from the IoT device that is presented on the interface;
   wherein the communication component, the capabilities augmenting component and the interface component comprise components of a virtual machine.

8. The system of claim 7 wherein the communication component comprises IoT device drivers and transmitting and receiving components.

9. The system of claim 7 wherein the communication component provides outputs that use a communication protocol that is uniform across the plurality of IoT devices.

10. The system of claim 7 wherein the capabilities augmenting component facilitates access to resources that comprise computational and memory resources.

11. The system of claim 7 wherein the interface is a user interface.

12. The system of claim 7 wherein the resources that augment the capabilities of the IoT device are located on one or more devices which are located remotely to the IoT device.

13. A method for virtualizing an IoT device, performed by a processor-based computing system, the method comprising:
   from a location remote to an IoT device of a plurality of IoT devices, controlling communication to and from the IoT device of the plurality of IoT devices using at least one control signal generated based upon respective communication protocols of a receiving IoT device and a transmitting IoT device;
   facilitating access to resources that augment the capabilities of the IoT device of the plurality of IoT devices based upon the at least one control signal wherein tasks of the IoT device are allocable to one or more different devices and performed by the one or more different devices on behalf of the first IoT device; and
   facilitating, in response to the at least one control signal, access to information that is directed to the IoT device from a unified interface that is common to the plurality of IoT devices, and facilitating access to information that is provided from the IoT device for presenting via the unified interface;
   wherein the communication component, the capabilities augmenting component and the interface component comprise components of a virtual machine.

14. The method of claim 13 wherein the controlling comprises the use of IoT device drivers and transmitting and receiving components.

15. The method of claim 13 wherein the communication comprises a protocol that is uniform across the plurality of IoT devices.

16. The method of claim 13 wherein the facilitating access to resources comprises facilitating access to computational and memory resources.

17. The method of claim 13 wherein the unified interface is a user interface.

18. The method of claim 13 wherein the resources that augment the capabilities of the IoT device are located on one or more devices which are located remotely to the IoT device.

* * * * *